United States Patent [19]

Kudo et al.

[11] 3,929,747

[45] Dec. 30, 1975

[54] PROCESS FOR PREPARING PETROLEUM RESIN COPOLYMERS OF $C_4$ AND $C_5$ ALIPHATIC MONOOLEFIN FRACTIONS AND STYRENE OR ITS DERIVATIVES

[75] Inventors: Ken-ichi Kudo; Yoshihiko Kitagawa; Hideyuki Kuribayashi, all of Niihama, Japan

[73] Assignee: Sumitomo Chemical Company, Limited, Osaka, Japan

[22] Filed: Dec. 2, 1974

[21] Appl. No.: 528,735

[30] Foreign Application Priority Data

Dec. 6, 1973  Japan.............................. 48-139123

[52] U.S. Cl............. 260/80.78; 260/82; 260/88.2 C
[51] Int. Cl.² ................ C08F 210/00; C08F 212/00; C08F 240/00
[58] Field of Search......... 260/80.72, 80.78, 88.2 C, 260/82

[56] References Cited
UNITED STATES PATENTS

| | | | |
|---|---|---|---|
| 2,604,465 | 7/1952 | Schneider et al. | 260/88.2 C X |
| 2,641,595 | 6/1953 | Leary | 260/88.2 C X |
| 3,058,963 | 10/1962 | Vandenberg | 260/88.2 C |
| 3,349,065 | 10/1967 | Kennedy | 260/85.3 R |
| 3,478,005 | 11/1969 | Wheeler | 260/80.78 X |
| 3,560,458 | 2/1971 | Kennedy et al. | 260/85.3 |
| 3,661,870 | 5/1972 | Bullard | 260/80.7 |
| 3,721,661 | 3/1973 | Susa | 260/94.8 |

*Primary Examiner*—Joseph L. Schofer
*Assistant Examiner*—Herbert J. Lilling
*Attorney, Agent, or Firm*—Stevens, Davis, Miller & Mosher

[57] ABSTRACT

A novel petroleum resin having excellent characteristics as a tackifier for use in a hot-melt adhesive is produced by copolymerizing a monomer mixture comprising 20 to 80 % by weight of aliphatic monoolefins mainly of four and five carbon atoms and 80 to 20 % by weight of styrene and/or a styrene derivative with a catalyst system comprising an organoaluminum compound represented by the general formula $AlR_nX_{3-n}$ (wherein R is an alkyl group having 1 to 4 carbon atoms, X is a halogen atom, and $n$ is 2 or 1.5) as main catalyst and an alkyl halide or a hydrogen halide as co-catalyst in a hydrocarbon solvent at a temperature of 0° to 60°C.

13 Claims, No Drawings

PROCESS FOR PREPARING PETROLEUM RESIN COPOLYMERS OF C₄ AND C₅ ALIPHATIC MONOOLEFIN FRACTIONS AND STYRENE OR ITS DERIVATIVES

This invention relates to a process for manufacturing a novel petroleum resin having excellent characteristics as a tackifier for use in a hot-melt adhesive.

It has been generally known that an aliphatic monoolefin and styrene and/or a styrene derivative are copolymerized by use of a catalyst of the Freidel-Crafts type such as aluminum chloride. The resin obtained by such a method, however, is undesirable as a tackifier for use in a hot-melt adhesive because of its poor compatibility with ethylene-vinyl acetate copolymers and other polymers and of discoloration and other disadvantages.

An object of this invention is to provide a colorless and clear petroleum resin having such tackiness and excellent compatibility that are very valuable for a tackifier for use in hot-melt adhesives.

Another object of this invention is to provide a novel method for manufacturing the said petroleum resin from aliphatic monoolefins and styrene and/or a styrene derivative.

A further object of this invention is to utilize effectively the monoolefins contained in $C_4$ and $C_5$ fractions produced from petroleum cracking as the source of the above-said aliphatic monoolefins.

Other objects of this invention will be apparent from the following description.

The present inventors were engaged in investigations on effective utilization of the monoolefins in $C_4$ and $C_5$ fractions produced by petroleum cracking. As a result, it was found that a colorless and clear resin having such tackiness and excellent compatibility that are very valuable for a tackifier for use in hot-melt adhesives is easily obtained by copolymerizing said monoolefins with styrene and/or a styrene derivative, in a hydrocarbon solvent and at a temperature of 0° to 60°C., with a catalyst system comprising an organoaluminum compound represented by the general formula $AlR_nX_{3-n}$ (wherein R is an alkyl group having 1 to 4 carbon atoms, X is a halogen atom, and $n$ is 2 or 1.5) as main catalyst and an alkyl halide or a hydrogen halide as a co-catalyst. Based on this finding, the present invention has been accomplished.

Since the petroleum resin obtained according to this invention is excellent in compatibility, tackiness, color, and, in addition, in thermal stability and solubility, it may be used very effectively as a tackifier for use not only in hot-melt adhesives, but also in adhesive tapes, synthetic rubbers, sealants, and the like.

The aliphatic monoolefins for use in this invention are those having mainly four and five carbon atoms contained in $C_4$ and $C_5$ fractions produced by petroleum cracking and the presence of 5% by weight or less of $C_3$, $C_6$ or higher monoolefins based on the aliphatic monoolefins mentioned above has no harmful effect. Preferred for use are so-called spent $C_4$ fraction and spent $C_5$ fraction obtained by removing dienic constituents such as butadiene, isoprene, 1,3-pentadiene, and cyclopentadiene. Depending upon the intended use of the resin, $C_4$ and $C_5$ monoolefins such as butene-1, isobutylene, pentene-1, 2-methylbutene-1, and 3-methylbutene-1 can be used each alone or in mixtures or added to the said spent $C_4$ and $C_5$ fractions. The styrene and its derivatives for use in this invention include styrene, α-methylstyrene, vinyl toluene, and dimethylstyrene, which may be used each alone or in mixtures.

The suitable monomer compositions for the copolymerization are 80 to 20 parts by weight of styrene and/or a derivative thereof for 20 to 80 parts by weight of aliphatic monoolefins. When a resin of higher softening point is required, a higher proportion of styrene and/or a styrene derivative is used. If the aliphatic monoolefins are reduced below 20 parts by weight, a resin with markedly reduced compatibility is formed, while if they are increased above 80 parts by weight, softening point of the resin becomes low and a highly viscous liquid resin is formed, both resins being undesirable for the object of this invention. The preferable monomer composition is 60 to 40 parts by weight of styrene and/or a derivative thereof for 40 to 60 parts by weight of aliphatic monoolefins.

The catalyst system according to this invention comprises an organoaluminum compound represented by the formula $AlR_nX_{3-n}$ (where R is an alkyl group having 1 to 4 carbon atoms, X is a halogen atom, and $n$ is 2 or 1.5) and a co-catalyst selected from alkyl halides and hydrogen halides. The organoaluminum compounds suitable for use are dimethylaluminum chloride, diethylaluminum chloride, dipropylaluminum chloride, diisobutylaluminum chloride, dimethylaluminum bromide, diethylaluminum bromide, methylaluminum sesquichloride, ethylaluminum sesquichloride, and ethylaluminum sesquibromide. Of these, diethylaluminum chloride and ethylaluminum sesquichloride are preferred.

The alkyl halides for use as co-catalysts with organoaluminum compounds are isopropyl chloride, isobutyl chloride, sec-butyl chloride, tert-butyl chloride, and tert-butyl bromide. Of these, tert-butyl chloride and tert-butyl bromide are preferred. The suitable hydrogen halides are hydrogen chloride and hydrogen bromide. These alkyl halides and hydrogen halides can be used in combinations of two or more members. The suitable molar ratio of the co-catalyst to the organoaluminum compound is from 0.01 to 2, preferably from 0.1 to 1. If the molar ratio of a co-catalyst to an organoaluminum compound is below 0.01 or above 2, the catalyst system becomes inferior in activity and unsuitable for the object of this invention.

The amount of organoaluminum compound to be used is 0.1 to 5%, preferably from 0.5 to 3%, by weight based on the weight of monomer mixture. If it is used in an amount below 0.1% by weight, the monomer conversion becomes inferior, while if it is used in an amount above 5% by weight, the conversion will scarcely be increased.

The contact of monomers with catalytic system can be conducted either after the organoaluminum compound and co-catalyst have been mixed and aged or by mixing both components of the catalyst system in the presence of a monomer mixture in a polymerization reactor.

The hydrocarbon solvents suitable for use in this invention include aliphatic hydrocarbons such as hexane, heptane, and the like, aromatic hydrocarbons such as benzene, toluene, xylene, ethylbenzene, and the like, and cyclohexane. Further, the paraffins contained in spent $C_4$ and $C_5$ fractions can be utilized conveniently as solvent.

Since an aliphatic hydrocarbon solvent tends to increase softening point of the resin formed, while an aromatic hydrocarbon solvent tends to decrease the softening point, it is possible to use these two types of hydrocarbons in suitable mixtures according to the intended object.

In view of the dispersion of catalyst and the removal of heat of polymerization, a suitable weight ratio of the hydrocarbon solvent to the monomer mixture is in the range from 0.2 to 3.0, preferably from 0.5 to 2.0.

The polymerization can be carried out at a temperature in the range from 0° to 60°C., preferably from 10° to 50°C. If the polymerization temperature is below 0°C., a resin of high molecular weight and poor solubility will be formed, while if it exceeds 60°C., only a resin with very low molecular weight will be formed. When such resins are used as a tackifier in a hot-melt adhesive, there may arise such undesirable problems as insufficient compatibility or fuming.

The polymerization according to this invention can be carried out by any polymerization procedure such as batchwise polymerization, semi-batchwise polymerization, or continuous polymerization.

The polymerization is conducted generally for 3 minutes to 5 hours, though there is no particular restriction on the duration of polymerization.

The polymerization mixture obtained according to this invention is contacted with, for example, methanol to terminate polymerization, washed with an alkali solution and water to remove the catalyst residue, and removed the solvent and low molecular weight polymer to obtain the petroleum resin.

The invention is illustrated below in detail with reference to Examples, but the invention is not limited thereto.

Among the physical characteristics of the resin shown in Examples, the softening point was measured by the ring and ball method specified in JIS-K2531 and the molecular weight (number-average molecular weight) was determined by Vapor Pressure Osmometry techniques. The styrene and styrene derivatives content was measured by the joint use of elementary analysis and IR absorption spectrometry.

EXAMPLE 1

Into a 300-ml glass reactor provided with a thermometer, reflux condenser, dropping funnel, and stirrer, which had been flushed with nitrogen to replace the air, were charged with stirring 25 g of a $C_4$ fraction of the composition shown in Table 1, 25 g of styrene, 40 g of xylene, and 10 g of a xylene solution containing 5% by weight of diethylaluminum chloride (1% by weight of diethylaluminum chloride based on the monomer mixture). Into the stirred reactor maintained at 25°C., was added dropwise through the dropping funnel 10 g of a xylene solution containing 2.8% by weight of tert-butyl bromide to initiate the polymerization (molar ratio of diethylaluminum chloride to tert-butyl bromide = 1/0.5). After 10 minutes of the dropwise addition, the reaction was continued for 20 minutes and then terminated by addition of 30 ml of methanol. The resulting mixture was washed by mixing with 30 ml of an aqueous solution containing 20% by weight of caustic soda and then the spent aqueous solution was removed by decantation. The resulting polymer solution was concentrated in a rotary evaporator under reduced pressure (150 mmHg), at 230°C., under a nitrogen stream. A colorless clear resin was obtained in a yield of 70%, said resin having a styrene content of 78%, a softening point of 67°C., and a molecular weight of 1260. The resin showed excellent tackiness and excellent compatibility with an ethylenevinyl acetate copolymer and could be used very satisfactorily as a tackifier in a hot-melt adhesive (it was found that the same applies to the resins obtained in Examples 2 to 10.)

EXAMPLE 2

Polymerization was carried out in the same manner as in Example 1, except that ethylaluminum sesquichloride and heptane were used in place of diethylaluminum chloride and xylene, respectively.

A clear colorless resin (styrene content 74%, softening point 87°C., molecular weight 2180) was obtained in a yield of 72%.

EXAMPLE 3

Polymerization was carried out in the same manner as in Example 1, except that a mixture comprising 20 g of styrene and 5 g of vinyltoluene (a mixture of 65% of m-vinyltoluene and 35% of p-vinyltoluene) was used in place of 25 g of sytrene and the polymerization temperature was 20°C. A colorless clear resin (styrene plus vinyltoluene content 73%, softening point 65°C., molecular weight 1160) was obtained in a yield of 71%.

EXAMPLE 4

Into a 300-ml glass reactor provided with a thermometer, reflux condenser, stirrer, monomer inlet, catalyst inlet, and overflow exit, which had been flushed with nitrogen to replace the air, was fed at a rate of 1 liter/hour through the monomer inlet a mixture comprising 20 parts by weight of the $C_4$ fraction having a composition shown in Table 1, 30 parts by weight of styrene, 50 parts by weight of xylene, and 0.41 part by weight of tert-butyl chloride. At the same time, on the other hand, into the reactor was fed at a rate of 50 ml/hour a xylene solution containing 10% by weight of ethylaluminum sesquichloride (concentration of ethylaluminum sesquichloride based on monomer mixture, 1% by weight; molar ratio of ethylaluminum sesquichloride to tert-butyl chloride, 1/1). Polymerization was carried out with stirring while removing the polymerization heat by external cooling to maintain the polymerization temperature at 10°C. The polymerization mixture flowed out of the overflow outlet was continuously contacted with methanol to terminate polymerization. The polymerization mixture flowed out of the reactor during an interval of 15 minutes after 1 hour from the start of polymerization was washed and concentrated in the same way as in Example 1 to obtain a colorless clear petroleum resin in a yield of 75%. The resin had a styrene content of 79%, a softening point of 67°C., and a molecular weight of 1010.

EXAMPLE 5

Example 4 was repeated, except that a xylene solution containing 10% by weight of diethylaluminum chloride was used in place of the xylene solution containing 10% by weight of ethylaluminum sesquichloride and a mixture comprising 14 parts by weight of the $C_4$ fraction shown in Table 1, 36 parts by weight of the $C_5$ fraction shown in Table 2, 25 parts by weight of styrene, 25 parts by weight of xylene, and 0.073 part by weight of hydrogen chloride was reacted at 30°C. A colorless clear resin was obtained in a yield of 57%. The resin had a styrene content of 76%, a softening point of 79°C., and a molecular weight of 1250.

EXAMPLE 6

Example 4 was repeated, except that a mixture comprising 30 parts by weight of the $C_4$ fraction shown in Table 1, 20 parts by weight of styrene, 50 parts by weight of heptane, and 0.60 part by weight of tert-butyl bromide was reacted at 35°C. A colorless clear resin was obtained in a yield of 67%. The resin had a styrene content of 71%, a softening point of 61°C., and a molecular weight of 910.

EXAMPLE 7

Into the reactor mentioned in Example 4, which had been flushed with nitrogen to replace the air, was fed at a rate of 1 liter/hour through the monomer inlet a mixture comprising 20 parts by weight of the $C_4$ fraction having a composition shown in Table 1, 30 parts by weight of styrene, and 50 parts by weight of xylene. At the same time, on the other hand, into the reactor was fed at a rate of 48 ml/hour a xylene solution containing diethylaluminum chloride and tert-butyl chloride (concentration of diethylaluminum chloride, 10% by weight; molar ratio of diethylaluminum chloride, to tert-butyl chloride, 1/1; concentration of diethylaluminum chloride based on the monomer mixture, 1% by weight). Polymerization was carried out with stirring at 30°C. and the polymerization mixture was treated in the same way as in Example 4 to obtain a colorless, clear resin in a yield of 59%. The resin had a styrene content of 75%, a softening point of 53°C., and a molecular weight of 1030.

EXAMPLE 8

Polymerization was carried out in the same manner as in Example 7, except that isobutylene was used in place of the $C_4$ fraction and the polymerization temperature was 20°C. A colorless clear resin was obtained in a yield of 82%. The resin had a styrene content of 75%, a softening point of 56.5°C., and a molecular weight of 1150.

EXAMPLE 9

Polymerization was carried out in the same manner as in Example 7, except that vinyltoluene (a mixture of 65% of m-vinyltoluene and 35% of p-vinyltoluene) was used in place of the styrene. A colorless, clear resin was obtained in a yield of 64%. The resin had a vinyltoluene content of 78%, a softening point of 57°C., and a molecular weight of 1100.

EXAMPLE 10

Into a 250-ml three-neck glass autoclave provided with a thermometer and stirrer, after the air in the autoclave had been replaced by nitrogen, was charged, in a way similar to that in Example 1, 25 g of the $C_4$ fraction of a composition shown in Table 1, 25 g of styrene, 40 g of xylene, and 10 g of a xylene solution containing 5% by weight of diethylaluminum chloride, while stirring the autoclave. Into the stirred autoclave maintained at 50°C., was fed 10 g of a xylene solution containing 2.75% by weight of tert-butyl bromide by means of a plunger pump to initiate polymerization. After 10 minutes of feeding, the polymerization was continued for 50 minutes at 50°C. and then terminated by addition of 30 ml of methanol by means of a plunger pump. The resulting mixture was washed and concentrated in the same way as in Example 1 to obtain a colorless, clear resin in a yield of 83%. The resin had a styrene content of 64%, a softening point of 45°C., and a molecular weight of 870.

COMPARATIVE EXAMPLE 1

Polymerization was carried out in the same manner as in Example 2, except that the polymerization temperature was −50°C. instead of 25°C. There was obtained a colorless, clear resin in a yield of 18%, which resin had a styrene content of 82%, a softening point of 91°C., and a molecular weight of 4340.

The resin was found to be of no practical value as a tackifier for use in a hot-melt adhesive, because the resin was poor in tackiness as well as in compatibility with an ethylene-vinyl acetate copolymer.

COMPARATIVE EXAMPLE 2

Polymerization was carried out in the same manner as in Example 7, except that a mixture comprising 5 parts by weight of the $C_4$ fraction, 45 parts by weight of styrene, and 50 parts by weight of xylene was used. A colorless, clear resin was obtained in a yield of 85%, which resin having a styrene content of 94%, a softening point of 97°C., and a molecular weight of 1240.

The resin was found to be of no practical value as a tackifier for use in hot-melt adhesives for the same reason as given in comparative Example 1.

COMPARATIVE EXAMPLE 3

Into the reactor described in Example 1, which had been flushed with nitrogen to replace the air, were charged 25 g of the $C_4$ fraction having a composition shown in Table 1, 25 g of styrene, and 40 g of xylene. Into the reactor, while being maintained at 25°C., was added dropwise from the dropping funnel 2.0 g of a complexed aluminum chloride catalyst [aluminum chloride/hydrogen chloride/mesitylene = 1/1/1 (molar ratio)]. The subsequent procedure was the same as in Example 1. Some gel-like precipitates were observed in the polymerization mixture after washing with an aqueous caustic soda solution. The washed polymerization mixture was separated from the gel-like precipitates and the water layer and then concentrated to obtain a yellow translucent petroleum resin in a yield of 74%, which resin had a styrene content of 70%, a softening point of 74°C., and a molecular weight of 1020.

The resin was found to be of no practical value because of discoloration and for the same reason as given in Comparative Example 1.

Table 1.

| Constituent | Composition of $C_4$ fraction. Concentration (% by weight) |
|---|---|
| Isobutane | 1.3 |
| n-Butane | 6.6 |
| 1-Butene | 24.0 |
| Isobutylene | 47.1 |
| trans-2-Butene | 10.2 |
| cis-2-Butene | 7.9 |
| Others | 2.9 |

Table 2.

| Constituent | Composition of $C_5$ fraction. Concentration (% by weight) |
|---|---|
| Isopentane | 25.1 |
| n-Pentane | 40.3 |
| 1-Pentene | 6.2 |
| 2-Methyl-1-butene | 13.2 |
| trans-2-Pentene | |

Table 2.-continued

| Constituent | Composition of C₅ fraction. Concentration (% by weight) |
|---|---|
| 2-Methylpentane 2,3-Dimethylbutane cis-2-Pentene | 2.7 |
| 3-Methylpentane 2-Methyl-2-butene | 6.0 |
| Cyclopentene | 1.7 |
| Others | 4.8 |

What is claimed is:

1. A process for manufacturing a petroleum resin, characterized by copolymerizing a monomer mixture of 20 to 80% by weight of aliphatic monoolefins mainly of four and five carbon atoms and 80 to 20% by weight of styrene and/or a styrene derivative with a catalyst system comprising an organoaluminum compound represented by the general formula $AlR_nX_{3-n}$ (wherein R is an alkyl group having 1 to 4 carbon atoms, X is a halogen atom, and $n$ is 2 or 1.5) as main catalyst and an alkyl halide or a hydrogen halide as co-catalyst, in a hydrocarbon solvent at a temperature of 0° to 60°C.

2. A process for manufacturing a petroleum resin according to claim 1, wherein spent $C_4$ and $C_5$ fractions obtained by removing dienic compounds from $C_4$ and $C_5$ fractions produced by petroleum cracking are used as the aliphatic monoolefin component.

3. A process for manufacturing a petroleum resin according to claim 1, wherein butene-1, isobutylene, pentene-1, 2-methylbutene-1, 3-methylbutene-1, or a mixture of these olefins is used as the aliphatic monoolefin component.

4. A process for manufacturing a petroleum resin according to claim 1, wherein styrene, α-methylstyrene, vinyltoluene, dimethylstyrene, or a mixture of these compounds is used as the styrene and styrene derivative component.

5. A process for manufacturing a petroleum resin according to claim 1, wherein the monomer mixture comprises 40 to 60% by weight of aliphatic monoolefins and 60 to 40% by weight of styrene and/or a styrene derivative.

6. A process for manufacturing a petroleum resin according to claim 1, wherein the organoaluminum compound is diethylaluminum chloride or ethylaluminum sesquichloride.

7. A process for manufacturing a petroleum resin according to claim 1, wherein amount of organoaluminum compound to be used is from 0.5 to 3% by weight based on the weight of monomer mixture.

8. A process for manufacturing a petroleum resin according to claim 1, wherein the alkyl halide is tert-butyl chloride or tert-butyl bromide.

9. A process for manufacturing a petroleum resin according to claim 1, wherein the hydrogen halide is hydrogen chloride or hydrogen bromide.

10. A process for manufacturing a petroleum resin according to claim 1, wherein the molar ratio of the co-catalyst to the organoaluminum compound is in the range from 0.1 to 1.

11. A process for manufacturing a petroleum resin according to claim 1, wherein the hydrocarbon solvent is an aliphatic hydrocarbon selected from hexane, heptane, and other paraffins; or an aromatic hydrocarbon selected from benzene, toluene, xylene, and ethylbenzene; or cyclohexane; or a mixture of these hydrocarbons.

12. A process for manufacturing a petroleum resin according to claim 1, wherein the weight ratio of the hydrocarbon solvent to the monomer mixture is in the range from 0.5 to 2.0.

13. A process for manufacturing a petroleum resin according to claim 1, wherein the copolymerization is carried out at a temperature in the range from 10° to 50°C.

* * * * *